United States Patent
Yamaguchi et al.

(10) Patent No.: US 7,852,420 B2
(45) Date of Patent: Dec. 14, 2010

(54) LIQUID CRYSTAL DISPLAY DEVICE WHICH REDUCES UNEVENNESS IN AN UPPER SURFACE OF AT LEAST AN ELECTRODE

(75) Inventors: Shinya Yamaguchi, Mitaka (JP); Kyoko Kojima, Kunitachi (JP); Yoshiaki Toyota, Hachioji (JP); Takeshi Ishida, Kodaira (JP)

(73) Assignee: Hitachi Displays, Ltd., Chiba (JP)

( * ) Notice: Subject to any disclaimer, the term of this patent is extended or adjusted under 35 U.S.C. 154(b) by 108 days.

(21) Appl. No.: 12/254,863

(22) Filed: Oct. 21, 2008

(65) Prior Publication Data
US 2009/0103031 A1    Apr. 23, 2009

(30) Foreign Application Priority Data
Oct. 22, 2007    (JP) .............................. 2007-273414

(51) Int. Cl.
G02F 1/136    (2006.01)

(52) U.S. Cl. ........................................ 349/43; 349/187

(58) Field of Classification Search .............. 349/42.96, 349/74, 89, 113, 114, 187
See application file for complete search history.

(56) References Cited

U.S. PATENT DOCUMENTS
2008/0002079 A1*    1/2008    Kimura ........................ 349/42

FOREIGN PATENT DOCUMENTS
JP    2000-111935    4/2000

* cited by examiner

*Primary Examiner*—Akm E Ullah
(74) *Attorney, Agent, or Firm*—Antonelli, Terry, Stout & Kraus, LLP.

(57) ABSTRACT

A liquid crystal display device comprises a first electrode disposed in a pixel area including an upper layer of a thin film transistor formed on a main surface of a first insulating substrate, a capacitive insulating layer disposed on the first electrode, and a second electrode disposed on the capacitive insulating layer. The first electrode and the second electrode are formed using a coated transparent electroconductive film and the capacitive insulating layer is formed using a coated insulating film.

7 Claims, 9 Drawing Sheets

LIQUID CRYSTAL DISPLAY DEVICE WHICH REDUCES UNEVENNESS IN AN UPPER SURFACE OF AT LEAST AN ELECTRODE

CROSS-REFERENCE TO RELATED APPLICATION

The present application claims priority from Japanese patent application JP 2007-273414 filed on Oct. 22, 2007, the content of which is hereby incorporated by reference into this application.

BACKGROUND OF THE INVENTION

1. Field of the Invention

The present invention relates to a technique for improving the flatness of an electrode surface in an inner surface of a substrate to enhance contrast in an in-plane switching liquid crystal display device, and particularly relates to a technique for using a coating material to form an entire capacitance-holding electrode structure for holding an electric field that is applied to the liquid crystal, whereby a level of cleanliness is maintained in a manufacturing step, a backlight transmissivity is assured to improve brightness, and a lower-cost panel is achieved by reducing material costs.

2. Description of the Related Art

An in-plane switching mode (also referred to as the IPS method) liquid crystal display device features a wide viewing angle. A transmissive liquid crystal display device is used in personal computers, televisions, and various other devices having mainly an indoor application, and a reflective or semi-transmissive liquid crystal display device is mainly used in mobile phones and other portable information terminals that are used in various environments including outdoors in clear weather as well as in a dark room. The transmissive liquid crystal display device controls luminous energy by modifying an array direction of the liquid crystal molecules when light from a backlight provided to the far side of the substrate on the side opposite from the viewing side is allowed to pass through the substrate. On the other hand, the reflective liquid crystal display device has a reflective film on the substrate on the side opposite of the viewing side. The reflective film is ordinarily used in combination with a pixel electrode or an opposing electrode, and an image is displayed by providing very small concavities and convexities to the reflective surface and scattering and reflecting external light that enters from the viewing side. The semi-transmissive liquid crystal display device is provided with a transmission part (transmission display part) and a reflection part (reflection display part), whereby both transmissive and reflective functions are provided, and display is made possible in various environments.

In a liquid crystal display device, including transmissive-, reflective-, and semi-transmissive-type devices, the contrast characteristics are one condition for high-quality display. One cause of a reduction in contrast in a liquid crystal display device is misalignment of the liquid crystal molecules caused by concavities and convexities of the electrode on the main surface (inner surface) of the substrate in contact with the liquid crystal layer. The orientation film is formed on the topmost surface of the main surface of the substrate in contact with the liquid crystal layer. Liquid crystal alignment controllability is imparted to the orientation film and initial alignment of the liquid crystal molecules in contact therewith is defined. Glass, plastic, or another insulating substrate is used as the substrate.

Electrodes (ordinarily, pixel electrodes and common electrodes; common electrodes are also referred to as opposing electrodes) for applying an electric field to liquid crystal in the main surface of the substrate constituting the liquid crystal display device, drive elements (ordinarily, thin film transistors) for driving these electrodes, and various wiring and electrodes are mutually formed in a layered state together with an insulating film and a protective film. The pixel electrodes and opposing electrodes are composed of a transparent electroconductive film typified by ITO or the like formed by sputtering. In an IPS-type liquid crystal display device, pixel electrodes, opposing electrodes, drive elements, wiring, and electrodes are formed only on one of the substrate sides (First substrate: TFT substrate). A light-blocking film (black matrix: BM; color filter: CF) is formed on another substrate (Second substrate: opposing substrate or CF substrate) facing the TFT substrate. In a vertical electric field-type (TN-type), an opposing electrode is formed on the CF substrate side. There are also configurations in which an electrode is provided to the CF substrate side even in a VA-type or another type of liquid crystal display device without limitation to a TN-type.

The substrate inner surface described above, i.e., the main surface of a TFT substrate that forms the thin film transistor has considerable concavities and convexities due to the complex cross-sectional shape of the thin film transistor as such. Accordingly, the surface of the electrode formed on the upper layer of the TFT substrate also has concavities and convexities that reflect the structure of the underlying layer. The concavities and convexities of such an electrode disrupt the distribution of the electric field that acts on the liquid crystal molecules, degrades blackness, and causes a reduction in the contrast. In an IPS device, the concavities and convexities of such an electrode contribute considerably to a reduction in contrast because liquid crystal molecules are rotated in a direction parallel to the substrate surface. Japanese Laid-open Patent Application No. 2000-111935 discloses an attempt to dispose a flattened layer on an electrode in order to flatten the concavities and convexities of the substrate inner surface, wherein a resin layer is inserted between the electrode and the insulating layer in a vertical electric field-type liquid crystal display device and the layer is flattened.

The electroconductive resin film in Japanese Laid-open Patent Application No. 2000-111935 is disclosed as being formed between the pixel electrode and the orientation film in the TFT substrate (paragraph [0038] in the specification of Japanese Laid-open Patent Application No. 2000-111935). A structure is disclosed in which the electroconductive resin film increases maximum brightness by reducing the thickness of the orientation film when liquid crystal having spontaneous polarization is used, and improves the contrast as a result (paragraph [0041] of the specification of Japanese Laid-open Patent Application No. 2000-111935).

In other words, it is not the intension of Japanese Laid-open Patent Application No. 2000-111935 to improve the contrast by flattening the concavities and convexities of the electrode of the main surface of the substrate. Additionally, the problem in which the IPS-type liquid crystal display device considerably affects the electric field that acts on the liquid crystal molecules due to the concavities and convexities of the electrode of the main surface of the substrate as well as the method for solving the issue are not addressed. The effect of the concavities and convexities of the electrode on the main surface of the substrate in an IPS-type liquid crystal display device on the contrast of the display is very high in comparison with a TN-type device. An improvement in the contrast in an IPS-type liquid crystal display device cannot be highly anticipated even if a configuration is adopted in which an electroconductive resin film such as that described in Japanese Laid-open Patent Application No. 2000-111935 is merely overlaid on the pixel electrode and the opposing electrode.

In the case that a coated transparent conductive electrode is inserted between the electrode and the capacitance-holding insulating film for holding an electric field applied to the liquid crystal and the electrode plane is flattened, the contrast can be improved by flattening without compromising the electroconductivity of the electrode.

In order to insert such a coated transparent electroconductive film between the electrode and the insulating film, however, ITO or another metal must be deposited as a film by sputtering or another vacuum deposition method, the transparent electroconductive film must ordinarily be formed thereafter in a coating step (nozzle discharge, spin coating, inkjet, and other methods) in an environment in contact with the atmosphere, after which chemical vapor growth or another film formation step in a vacuum device must again be used in order to form an insulating film. The coated transparent electroconductive film material includes metal microparticles, organic polymer, or the like, and impurities in the atmosphere become deposited on the surface in the coating step. Consequently, residue and impurities are diffused in the layered films when processing is carried out in a vacuum and high-temperature condition, and the operation of the semiconductor may be degraded or the manufacturing device may become contaminated.

There is also a problem in that flattening is insufficient when using a coated film alone. The transmissive display part has thin film transistor-induced concavities and convexities described above and the reflective display part also has scattering reflective electrode-induced concavities and convexities. The thickness of the coated transparent electroconductive film must be considerable in order to sufficiently flatten the concavities and convexities. Simultaneously assuring sufficient transparency with such a film thickness presents a problem in terms of implementation because there are many limitations in the selection or the like of coating materials.

There is a further problem in that ITO and the like that are used for forming a film by sputtering have become rare metals in recent years due to worldwide resource shortages. In the layered structure in which a coated transparent electroconductive film is inserted between the capacitance-holding insulating film and the electrode, there is a problem in that the structure is not suited to reducing costs overall because the amount of ITO and other rare metals used in a pixel electrode or a common electrode is not different from a conventional structure that does not use a coated electroconductive film, and has the additional cost of the material for coating.

SUMMARY OF THE INVENTION

An object of the present invention is to provide an IPS-type liquid crystal display device in which a reduction of contrast caused by concavities and convexities of the electrode on the main surface (inner surface) of the substrate is improved, the level of cleanliness of the manufacturing step is maintained, sufficient light transmittance is assured, and costs are reduced.

The liquid crystal display device of the present invention has a first insulating substrate, a second insulating substrate, and a liquid crystal layer sealed between the first insulating substrate and the second insulating substrate. The liquid crystal display device comprises:

a thin film transistor formed on each pixel in the main surface of the first insulating substrate;

a base electrode disposed in a pixel area including the upper layer of the thin film transistor;

a first electrode having a coated transparent electroconductive film on the base electrode;

a capacitive insulating layer composed of a coated insulating film on the first electrode; and a second electrode composed of a coated transparent electroconductive film on the capacitive insulating layer, wherein the thin film transistor controls the liquid crystal by applying a voltage between the first electrode and the second electrode.

In a transmissive-type or transmissive display part, a coated transparent conductive electrode is disposed on a base electrode (e.g., a common electrode) composed of ITO or another metal formed by sputtering, concavities and convexities formed by steps or the like in the formation part of the thin film transistor (TFT) in the base layer are absorbed, and the electric field discharge surface of the first electrode is flattened. The concavities and convexities can be sufficiently flattened by disposing a coated insulating film on the first electrode and forming a capacitive insulating layer. The thickness of the first electrode required for flattening is thereby reduced, light transmittance is maintained, a horizontal electric field into the liquid crystal layer formed between the first electrode and the second electrode (e.g., pixel electrode) is appropriately arranged, and the contrast is improved. It is thereby possible to perform the first electrode formation step thereafter without the use of a vacuum device by forming the second electrode as such using a coated transparent electroconductive film. Costs can be lowered by reducing the amount of ITO or other metal electrode raw material used in the second electrode formed by conventional sputtering. In some cases, formation of the base electrode and an organic insulating film (organic PAS film) can be omitted, and a coated transparent conductive electrode can be directly formed so as to cover the inorganic insulating film (inorganic PAS film). The steps can be simplified and the costs can be reduced by using this configuration as the first electrode.

In a reflective-type device or the reflective display part of a semi-transmissive-type device, a first electrode composed of a coated transparent electroconductive film is disposed on aluminum constituting the reflective display electrode or on another scattering reflective electrode, and the surface concavities and convexities formed on the scattering reflective electrode are flattened, whereby the electric field radiation surface is flattened and the contrast is improved. The structure of the first electrode is the same as the transmissive display part described above.

In any of the above cases, the combination of these two layers, i.e., the first electrode and the capacitance-holding insulating film, is endowed with physical properties determined by the thickness required for flattening, the flatness, the light transmittance for allowing backlight and exterior light to be sufficiently transmitted, the electric conductivity (first electrode), the dielectric constant (capacitance-holding insulating film), and the like. The combination of three layers obtained by adding a second electrode onto the above two layers is endowed with physical properties determined by the light transmittance necessary to allow backlight and exterior light to be sufficiently transmitted, the electric conductivity (second electrode), and the like.

DETAILED DESCRIPTION OF THE INVENTION

Preferred embodiments of the present invention are described below in detail with reference to the diagrams.

First Embodiment

Figure 1:
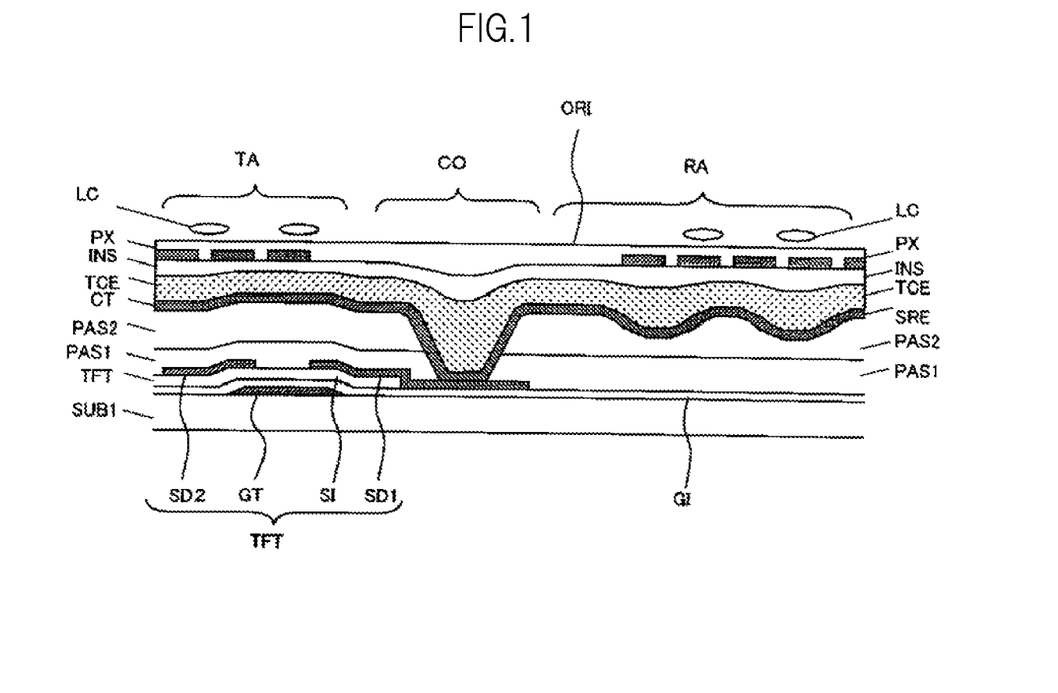
FIG. 1 is a partial cross-sectional view of a semi-transmissive liquid crystal display device having both a transmissive display part and a reflective display part, illustrating the first embodiment of the present invention.

FIG. 1 is a partial cross-sectional view of a semi-transmissive liquid crystal display device having both a transmissive display part and a reflective display part, illustrating the first embodiment of the present invention. In FIG. 1, a thin film transistor TFT is formed on the main surface of a glass substrate SUB1 as an insulating substrate. The thin film transistor TFT is composed of a gate electrode GT, a gate insulating film GI, a silicon semiconductor layer SI, a drain electrode SD1, and a source electrode SD2.

An inorganic insulating film PAS1 and an organic insulating film PAS2 are sequentially formed to cover the thin film transistor TFT, and a base electrode CT is formed on these inorganic and organic insulating films. The base electrode CT is a pixel electrode in a transmissive display part TA and is a scattering reflective electrode SRE in a reflective display part RA. The base electrode CT of the transmissive display part TA has concavities and convexities that reflect the structure or the like of the thin film transistor TFT of the lower layer. The scattering reflective electrode SRE of the reflective display part RA has concavities and convexities that reflect the shape in which the surface of the organic insulating film PAS2 of the lower layer has been processed to have concavities and convexities. The scattering reflective electrode SRE of the reflective display part RA also has the function of an electrode for applying an electric field to the liquid crystal.

A first electrode TCE is coated onto the base electrode CT (including the scattering reflective electrode SRE) so as to embed the concavities and convexities of the base electrode CT of the lower layer and flatten the surface. The first electrode TCE is a coating formed from a transparent electroconductive material. A capacitive insulating layer INS is further coated and formed on the transparent conductive electrode TCE. The thickness of the first electrode TCE and the thickness of the capacitive insulating layer INS are adjusted so as to have a thickness that is sufficient for flattening the concavities and convexities of the base electrode CT using a combination of the first electrode TCE and the capacitive insulating layer INS and so as to have light transmittance for assuring a required luminous energy. A second electrode PX is coated and formed on the capacitive insulating layer INS. The capacitive insulating layer INS has a function for forming a holding capacitance of the liquid crystal with the upper and lower electrodes, and is also referred to as a capacitance film. The second electrode PX is formed having a plurality of slits in which a plurality of edges is formed facing the surface of the base electrode CT (including the scattering reflective electrode SRE). The surface of the protective insulating layer INS is flattened by the effect of the first electrode TCE and the capacitive insulating layer INS, and the second electrode PX is formed substantially parallel to the surface of the first electrode TCE. An orientation film ORI is formed to cover the second electrode PX and is in contact with the liquid crystal LC. The orientation film ORI is endowed with a liquid crystal alignment control function by using a rubbing treatment or the like.

The formation of the first electrode TCE described above will be described in further detail. A capacitive insulating layer INS is coated and formed on the base electrode CT (including the scattering reflective electrode SRE) formed using ITO or another metal by sputtering in the transmissive display part TA, and is also coated and formed on the first electrode TCE. The concavities and convexities produced by a TFT step of the base are flattened and sufficient light transmittance is assured by the combination of the two layers, i.e., the first electrode TCE and the capacitive insulating layer INS. The following is a specific numerical example. The first electrode TCE has a thickness of 300 nm to 2 μm, a surface flatness of $\geq 0.5$ in relation to the base concavities and convexities, a maximum unevenness of $\leq 1$ μm, an average unevenness of $\leq 500$ nm, a light transmittance in a predetermined wavelength region (300 nm to 800 nm) of $\geq 80\%$, and a sufficiently low electric resistivity of $\leq 5E9\Omega/\square$ in order to perform image switching without delay. The capacitive insulating layer INS has a thickness of 100 nm to 1 μm, a surface flatness of $\geq 0.5$ in relation to the surface concavities and convexities of the first electrode TCE, a maximum unevenness of $\leq 1$ μm, an average unevenness of $\leq 500$ nm, a light transmittance in a predetermined wavelength region (300 nm to 800 nm) of $\geq 90\%$, and a sufficient dielectric constant of ≧4 in order to hold capacitance. A second electrode PX is furthermore formed as a coating on the capacitive insulating layer INS. The second electrode PX does not contribute to flattening and can preferably maintain as much light transmittance as possible while at the same time having sufficient electrical conductivity as an electrode; more specifically, a thickness of 300 nm to 2 μm, a transmittance of ≧80% in a predetermined wavelength region (300 nm to 800 nm), and an electric resistivity of ≦5E9Ω/□. These three layers, i.e., the first electrode TCE, the capacitive insulating layer INS, and the second electrode PX constitute a capacitor, and a horizontal electric field is applied to the liquid crystal layer.

In the reflective display part RA, the surface concavities and convexities of the scattering reflective electrode SRE is flattened by disposing the first electrode TCE on the scattering reflective electrode SRE formed by sputtering aluminum, tungsten, molybdenum, or the like, and by disposing the capacitive insulating layer INS on the first electrode TCE. The thickness, surface flatness, transmittance, electric resistance, and the like of the first electrode TCE, the capacitive insulating layer INS, and the second electrode PX in the reflective display part RA are equivalent to the specifications of the transmissive display part TA.

In the present embodiment, the first electrode TCE and the base electrode CT constituting the transmissive display part TA and the reflective display part RA are connected to the drain electrode SD1 of the thin film transistor TFT via a contact part CO. The thin film transistor TFT applies to the base electrode CT (including the first electrode TCE) a voltage that corresponds to the display data supplied from the data line control circuit, as described below. The second electrode PX is kept at a constant electric potential, and an alignment direction of the liquid crystal molecules is controlled in accordance with the magnitude of the electric field generated by the difference in voltage from the voltage applied to the base electrode CT (first electrode TCE). The effect of the present invention is the same even if the upper and lower relationship of the first electrode and the second electrode is switched.

Second Embodiment

Figure 2:
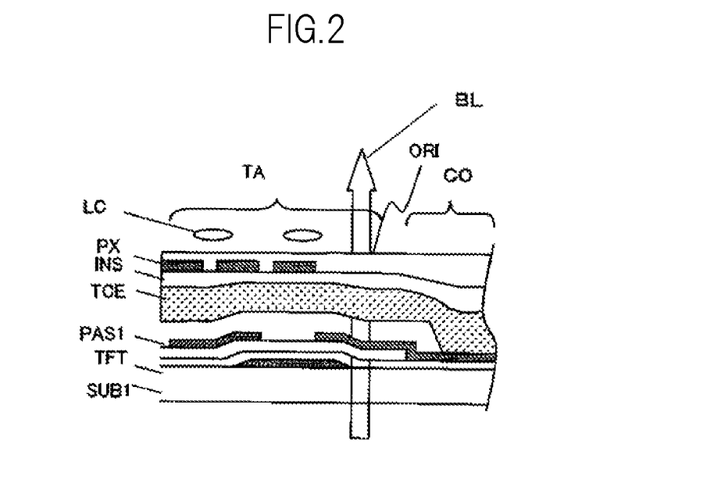
FIG. 2 is a partial cross-sectional view of the transmissive display part of a semi-transmissive liquid crystal display device having both a transmissive display part and a reflective display part, illustrating the second embodiment of the present invention.

FIG. 2 is a partial cross-sectional view of the transmissive display part TA of a semi-transmissive liquid crystal display device having both a transmissive display part and a reflective display part, illustrating the second embodiment of the present invention. In FIG. 2, the same reference numerals as FIG. 1 show the same functional portions. In the second embodiment, the base electrode CT and the organic insulating film PAS2 in FIG. 1 have been removed. In other words, the first electrode TCE is disposed directly on the inorganic insulating film PAS1, and the result is used as a pixel electrode (or a common electrode). The structure of the reflective display part RA is also the same. The base electrode CT (including the scattering reflective electrode SRE) and the organic insulating film PAS2 are removed, the first electrode TCE is directly disposed on the inorganic insulating film PAS1, and this is used as a scattering reflective electrode. Accordingly, the structure can be simplified and manufacturing costs can be reduced.

In the second embodiment, the thickness, surface flatness, maximum unevenness, and average unevenness of the first electrode TCE, the capacitive insulating layer INS, and the second electrode PX are the same as in the first embodiment, but the transmittance can be less by an amount commensurate with the loss of light absorption by the organic insulating film PAS2 and the base electrode CT. Specifically, the conditions are that the first electrode TCE have a transmittance of ≧70%, the capacitive insulating layer INS have a transmittance of ≧80%, and the second electrode PX have a transmittance of ≧80% in a predetermined wavelength region (300 nm to 800 nm). In relation to the first electrode TCE and the second electrode PX, however, a condition is that the electric resistivity be ≦1E6Ω/□, which is less than that of the first embodiment, because electric current must be sent in the horizontal direction. In accordance with the second embodiment, the structure can be simplified and manufacturing costs can be reduced.

The structure of the transmissive display part TA in the first and second embodiments described above may each be used independently as a transmissive liquid crystal display device, and may be combined together with each of the reflective display parts RA described in the first and second embodiments and used as a semi-transmissive liquid crystal display device. The upper and lower relationship of the first electrode TCE and the second electrode PX can be switched in the same manner as in the first embodiment.

Figure 3:
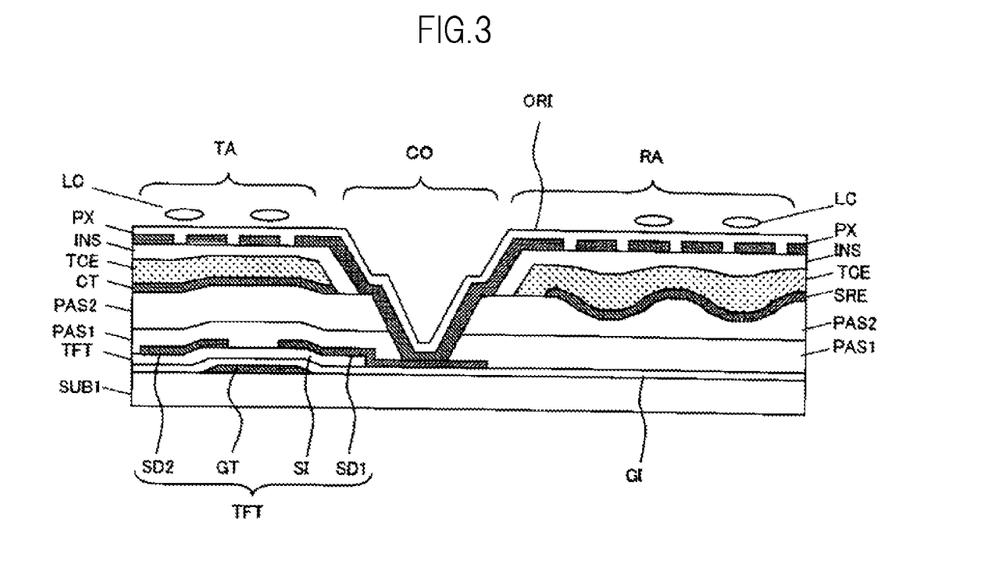
FIG. 3 is a partial cross-sectional view of a semi-transmissive liquid crystal display device having both a transmissive display part and a reflective display part, illustrating the third embodiment of the present invention.

FIG. 3 is a partial cross-sectional view of a semi-transmissive liquid crystal display device having both a transmissive display part and a reflective display part, illustrating the third embodiment of the present invention. In the present embodiment, the second electrode PX is connected to the drain electrode SD1 of the thin film transistor TFT via a contact part CO. The second electrode PX that passes through the side surface of the contact part CO in this case features a configuration in which insulation between the first electrode TCE and the capacitive insulating layer is assured because the capacitive insulating layer INS is also formed so as to cover the side surface of the contact part CO in the same manner. A similar function can be obtained thereby even if an electric signal is inverted between the first electrode TCE and the second electrode PX. In FIG. 3, reference numerals that are the same in FIG. 1 indicate the same functional portions.

Figure 4:
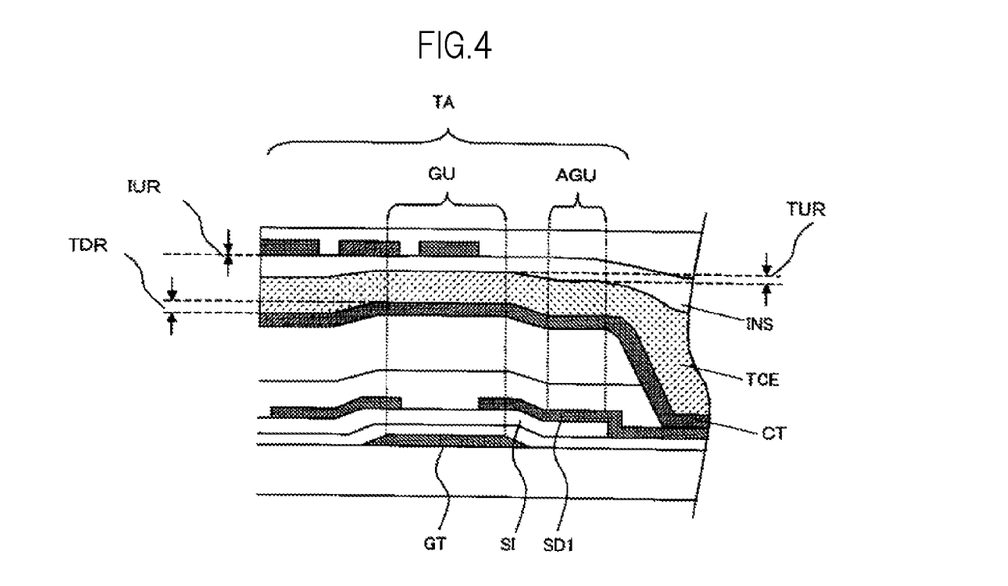
FIG. 4 is a partial cross-sectional view of a liquid crystal display device, illustrating in detail the transmissive display part of the first embodiment of the present invention.

FIG. 4 is a cross-sectional view depicting in detail the transmissive display part TA of the first embodiment of the present invention. The transmissive display part TA is composed of a gate electrode overlapping area GU superimposed on the gate electrode GT of the thin film transistor, a gate electrode non-overlapping area AGU that is not superimposed on the gate electrode GT, and a height difference TUR of the first electrode upper surface is less than the height difference TDR of the lower surface of the first electrode TCE between the gate electrode overlapping area GU and the gate electrode non-overlapping area AGU. It is accentuated in the present embodiment that flattening based solely on the first electrode TCE is not complete, and the height difference IUR of the capacitive insulating layer upper surface is even less than the height difference TUR of the first electrode upper surface due to the capacitive insulating layer INS formed as a coating on the first electrode TCE. The drawing shows the manner in which the TFT is almost completely flattened using a combination of the first electrode TCE and the capacitive insulating layer IUR.

Figure 5:
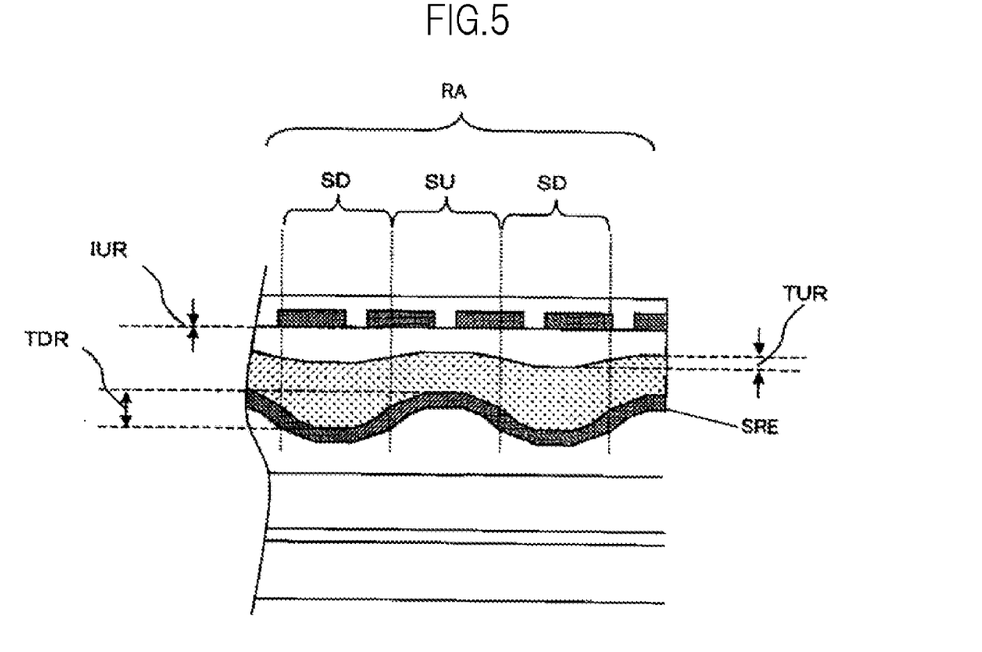
FIG. 5 is a partial cross-sectional view of a liquid crystal display device, illustrating in detail the reflective display part of the first embodiment of the present invention.

FIG. 5 is a cross-sectional view depicting in detail the reflective display part RA of the first embodiment of the present invention. Concavities and convexities are formed in the scattering reflective electrode SRE of the reflective display part RA, and the concavities and convexities are composed of upwardly convex areas SU and upwardly concave areas SD. The drawing shows that between the upwardly convex areas SU and the upwardly concave areas SD, the height difference TUR of the first electrode upper surface is less than the height difference TDR of the lower surface of the first electrode TCE and the height difference IUR of the capacitive insulating layer upper surface is even less than the height difference TUR of the first electrode upper surface.

Figure 6:
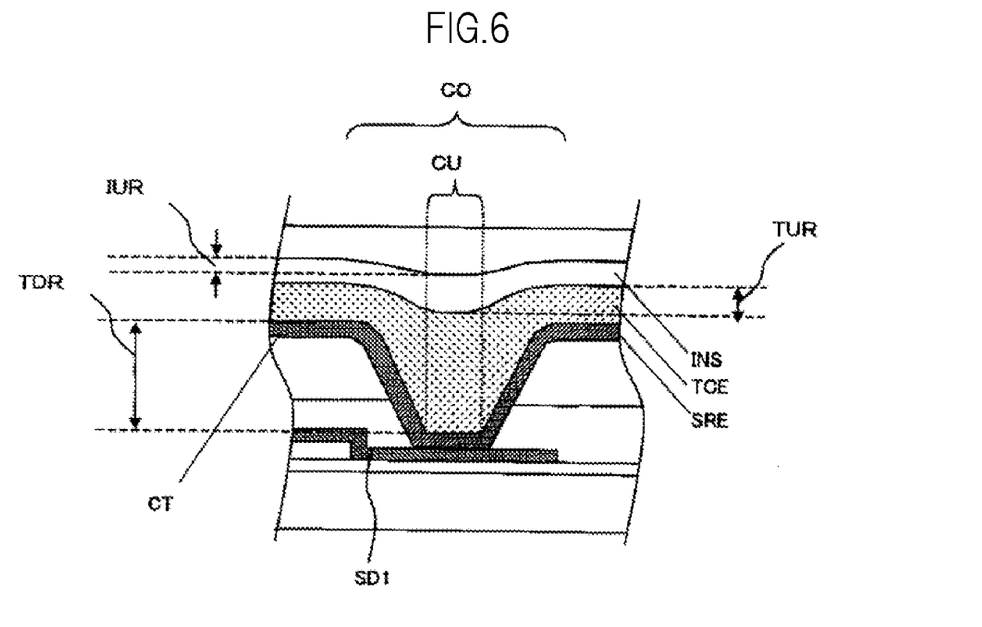
FIG. 6 is a partial cross-sectional view of a liquid crystal display device, illustrating in detail the contact part of the first embodiment of the present invention.

FIG. 6 is a cross-sectional view depicting in detail the contact part CO of the first embodiment of the present invention. The contact part CO has a wiring connection area CU in which the drain electrode SD1, the base electrode CT (including the scattering reflective electrode SRE), and the first electrode TCE are in contact, and the drawings shows that between the wiring connection area CU and the areas other than the wiring contact area, the height difference TUR of the first electrode upper surface is less than the height difference TDR of the lower surface of the first electrode TCE and the height difference IUR of the capacitive insulating layer upper surface is even less than the height difference TUR of the first electrode upper surface.

Figure 7:
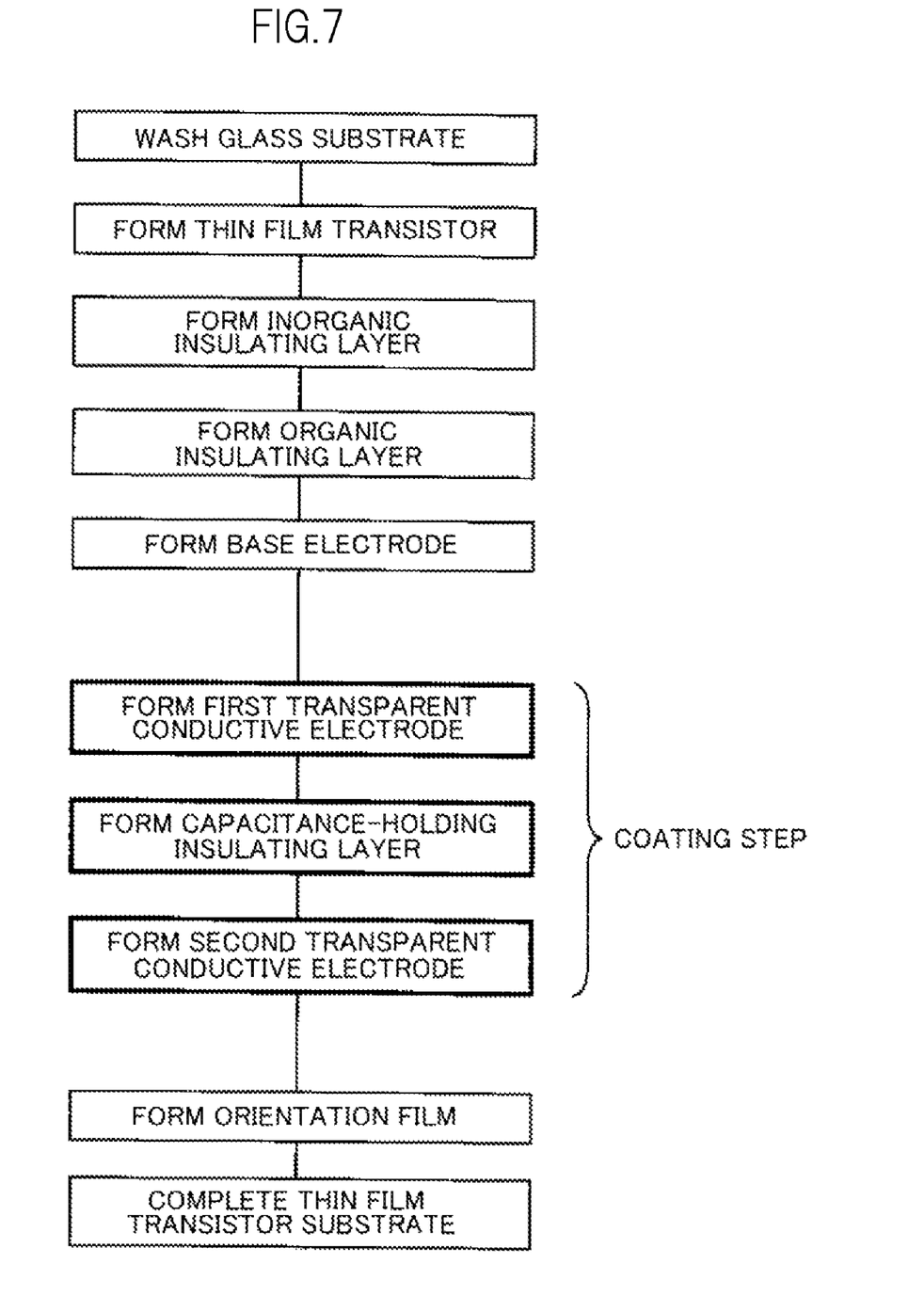
FIG. 7 is a view showing the steps for manufacturing the liquid crystal display device of the first embodiment of the present invention.

FIG. 7 is a view showing the steps for manufacturing the liquid crystal display device of the first embodiment of the present invention. The manufacturing steps include a step for receiving and cleaning a glass substrate, a step for forming a thin film transistor for each pixel on the main surface of the substrate, a step for forming an insulating film composed of an inorganic material on the thin film transistor TFT, a step for forming an insulating film composed of an organic material on the inorganic insulating film, a step for forming a base electrode by sputtering or the like on the organic insulating film, a step for subsequently forming a first electrode using a coated transparent electroconductive film on the base electrode, a step for forming a capacitive insulating layer using a coated insulating film on the first electrode, and a step for forming a second electrode by using a coated transparent electroconductive film on the capacitance insulating layer, wherein all the steps from the first electrode formation step to the second electrode formation step are carried out in a coating step. Lastly, the diagram shows a method of manufacturing a liquid crystal display device composed of a series of steps for forming an orientation film and completing the thin film transistor substrate.

Figure 8:
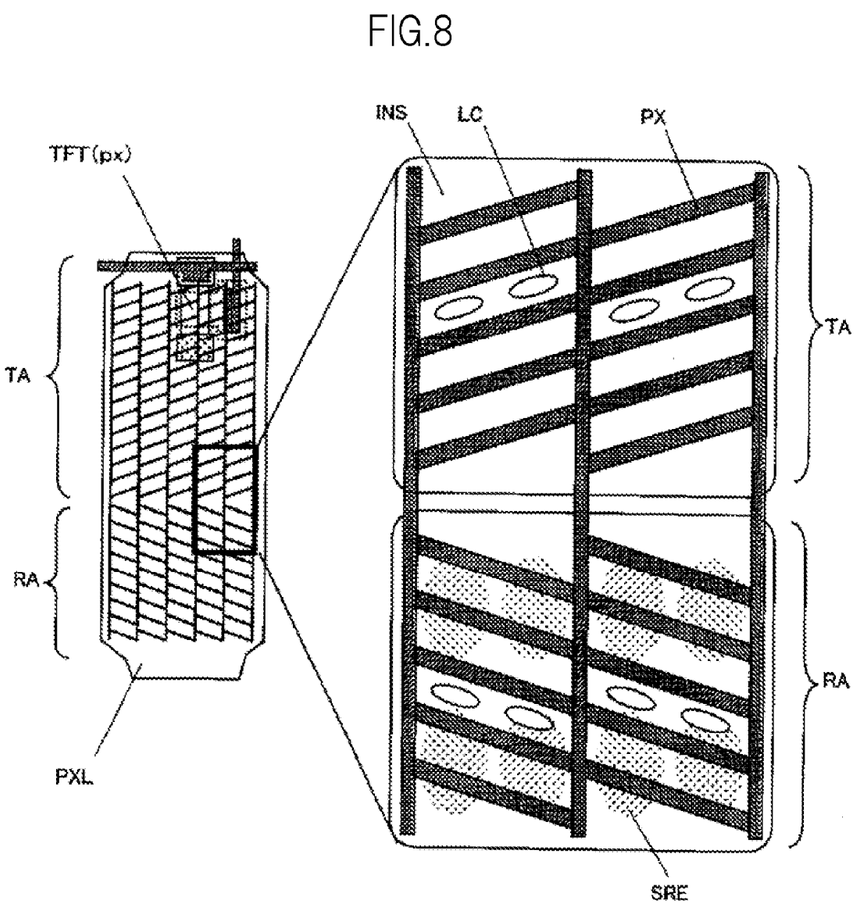
FIG. 8 is a plan view for describing a configuration example of a single pixel of the semi-transmissive liquid crystal display device of the present invention.

FIG. 8 is a plan view for describing a configuration example of a single pixel of the semi-transmissive liquid crystal display device of the present invention. A single pixel PXL is formed by using a structure in which the transmissive display part TA and the reflective display part RA are adjacent to each other, and second electrodes (pixel electrodes) PX are formed on the protective insulating layer (capacitance film) INS of each display part. The second electrodes (pixel electrodes) PX are patterned in the form of slits, and the amount of light emitted is controlled by controlling the alignment direction of the molecules of the liquid crystal LC by using a horizontal electric field (substantially parallel to the paper surface) formed between the edge of the second electrode and an undepicted first electrode. In the reflective display part RA, light that has entered from the exterior is scattered by the concavities and convexities of the scattering reflective electrode film in the base and is allowed to exit to the exterior again. However, the surface of the protective insulating film (capacitance film) INS is flat due to the effect of the first electrode and the capacitive insulating layer, as described above, and the second electrodes PX are also formed substantially parallel to the first electrode.

Figure 9:
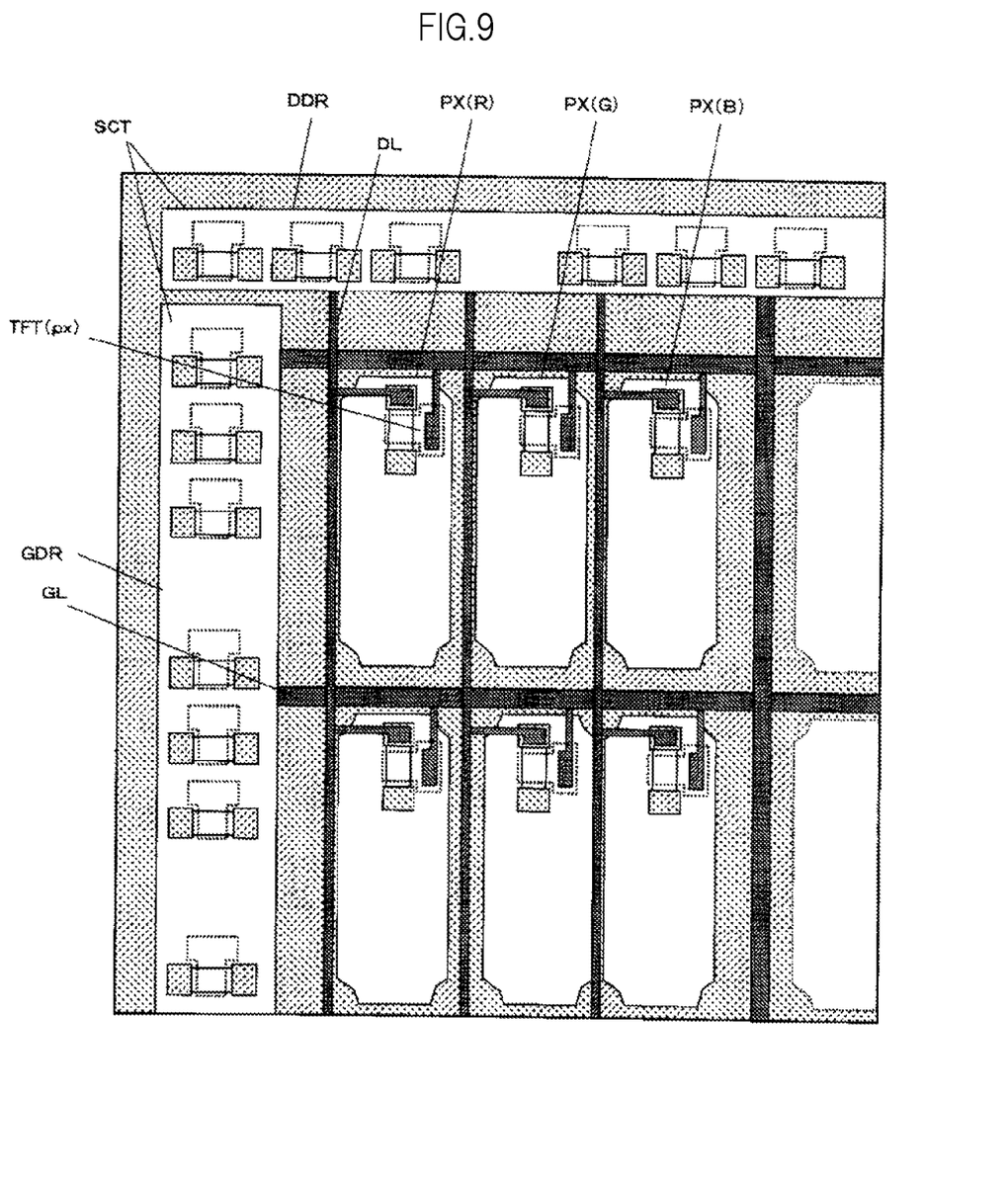
FIG. 9 is a partial plan view of a thin film transistor substrate of the semi-transmissive liquid crystal display device of the present invention.

FIG. 9 is a partial plan view of a thin film transistor substrate of the semi-transmissive liquid crystal display device of the present invention. Three pixels (color sub-pixels) PX(R), PX(G), PX(B) that correspond to three primary colors (R, G, B) are formed on a substrate adjacent to each other in the display area on the substrate. A gate electrode of the thin film transistor TFT (px) of each pixel and the drain and source electrodes are connected to a write line (gate wire) GL and data line DL, respectively. Such a configuration is a matrix array having a size that is commensurate with the number of pixels, and a peripheral circuit SCT is disposed about the display area, the peripheral circuit being composed of a data line control circuit DDR for controlling the bundle of data lines, and write line control circuit GDR for controlling the bundle of write lines.

Figure 10:
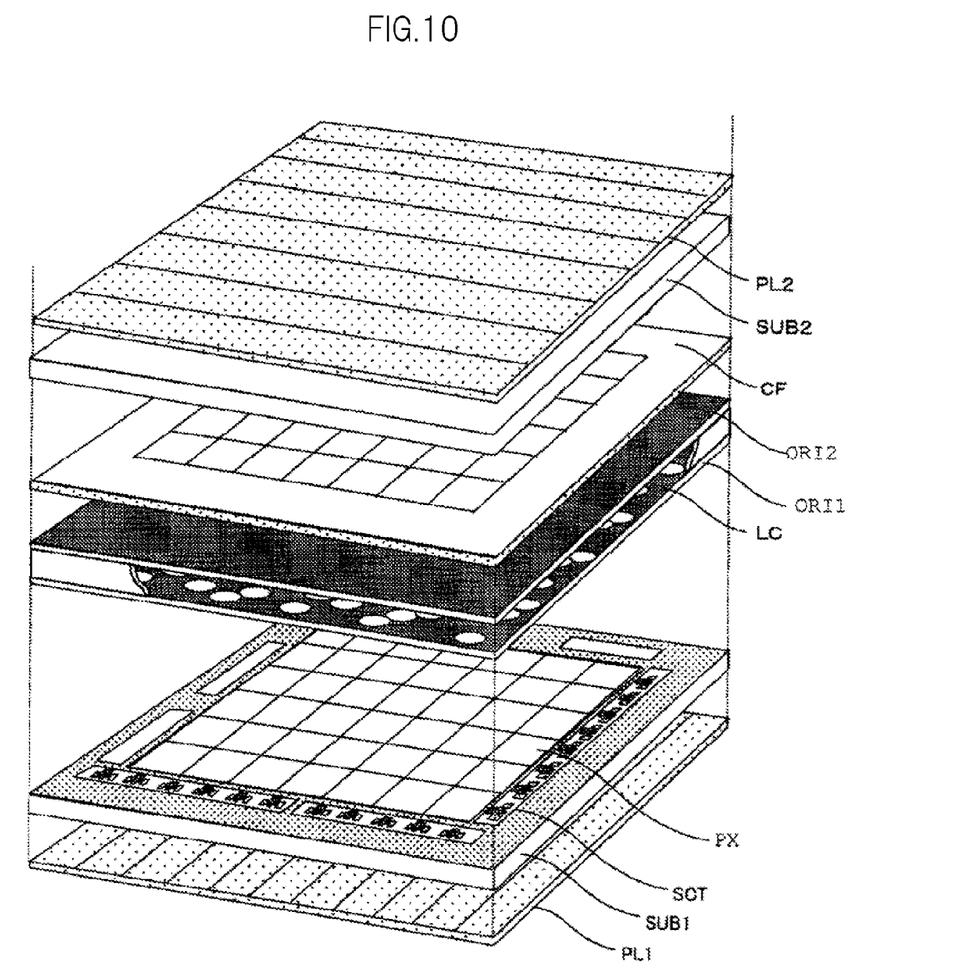
FIG. 10 is an exploded perspective view for describing a liquid crystal display device in a state in which a thin film transistor substrate and a color filter substrate are combined via a liquid crystal layer.

FIG. 10 is an exploded perspective view for describing a liquid crystal display device in a state in which a thin film transistor substrate and a color filter substrate are combined via a liquid crystal layer. The main surface of the thin film transistor substrate SUB1 described above has a peripheral circuit SCT and pixels PX arranged in a matrix. An orientation film ORI1 is formed on the topmost layer of the main surface. A lower polarizing plate PL1 is disposed on the surface opposite (back surface) from the main surface. On the other hand, a plurality of color filters CF partitioned in the form of a black matrix is formed on the main surface of a color filter substrate SUB2. An orientation film ORI 2 is formed on the topmost layer, which is the upper layer of the color filter CF, and an upper polarizing plate PL2 is disposed on the surface opposite (front surface) from the main surface. The liquid crystal layer LC is sealed so as to be sandwiched between the orientation film ORI1 and the orientation film ORI2 to constitute a liquid crystal display device.

Figure 11:
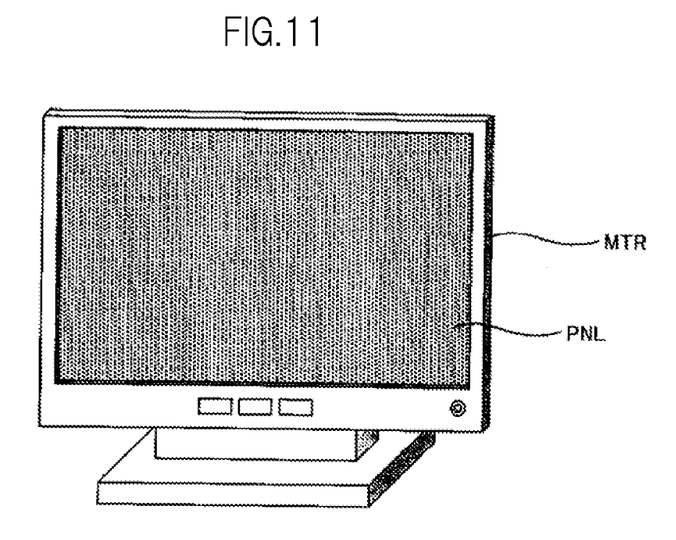
FIG. 11 is a view in which the liquid crystal display device PNL of the present invention is mounted on a display monitor MTR for a personal computer.
Figure 12:
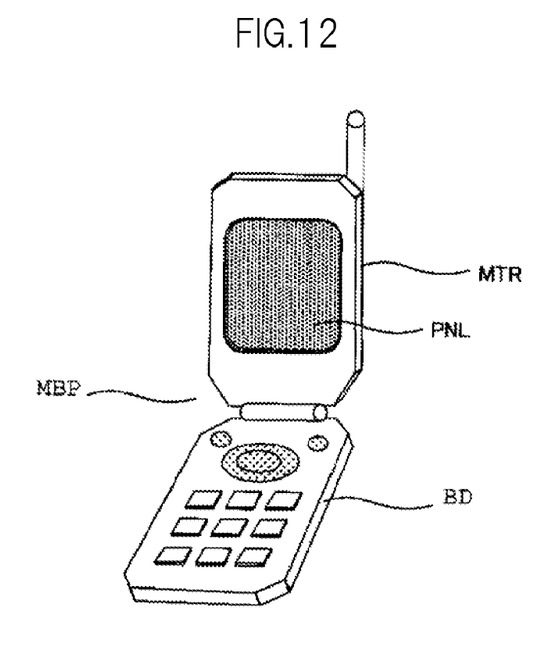
FIG. 12 is a view in which the liquid crystal display device PNL of the present invention is mounted on a display monitor MTR connected to the body BD of a mobile phone MBP.
Figure 13:
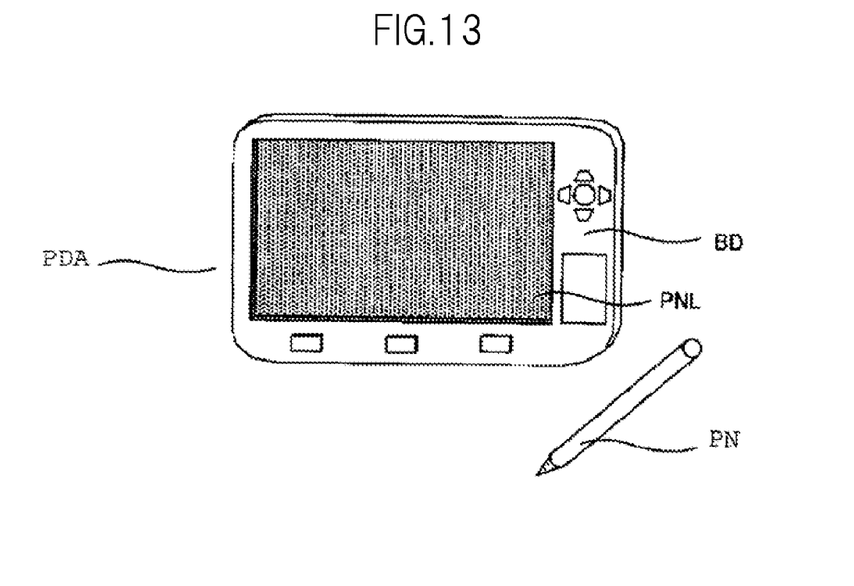
FIG. 13 is a view in which the liquid crystal display device PNL of the present invention is mounted on a display monitor MTR incorporated into the body BD of a mobile terminal PDA.
Figure 14:
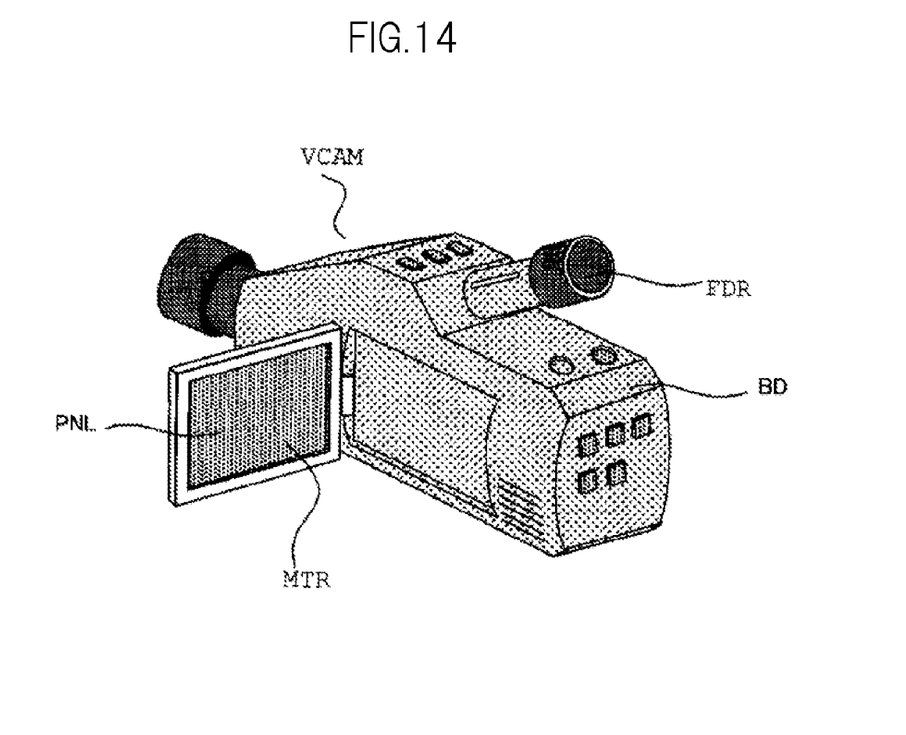
FIG. 14 is a view in which the liquid crystal display device PNL of the present invention is mounted on a display monitor MTR and a finder FDR incorporated into the body BD of a video camera VCAM.

Next, examples of devices in which the liquid crystal display device of the present invention are applied will be described with reference to FIGS. 11 through 14. FIG. 11 is a view in which the liquid crystal display device PNL of the present invention is mounted on a display monitor MTR for a personal computer. FIG. 12 is a view in which the liquid crystal display device PNL of the present invention is mounted on a display monitor MTR connected to the body BD of a mobile phone MBP. FIG. 13 is a view in which the liquid crystal display device PNL of the present invention is mounted on a display monitor MTR incorporated into the body BD of a mobile terminal PDA. FIG. 14 is a view in which the liquid crystal display device PNL of the present invention is mounted on a display monitor MTR and a finder FDR incorporated into the body BD of a video camera VCAM.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first insulating substrate;
   a second insulating substrate;
   a liquid crystal layer sealed between the first insulating substrate and the second insulating substrate;
   a thin film transistor corresponding to a pixel on a main surface of the first insulating substrate;
   a base electrode disposed in a pixel area including an upper layer of the thin film transistor, the pixel area having a transmissive display part, the transmissive display part including a gate electrode overlapping area superimposed on a gate electrode of the thin film transistor and a gate electrode non-overlapping area which is not superimposed on the gate electrode;
   a first electrode including a coated transparent electroconductive film on the base electrode;
   a capacitive insulating layer including a coated insulating film on the first electrode; and a second electrode including a coated transparent electro-conductive film on the capacitive insulating layer, the second electrode having a plurality of slits in which a plurality of edges of the slits are formed above a surface of the first electrode;

wherein one of the first electrode and the second electrode is a common electrode, the other of the first electrode and the second electrode is a pixel electrode, and at least one of the base electrode, the commonly electrode and the pixel electrode is electrically connected to a drain electrode of the thin film transistor;

wherein the thin film transistor controls a voltage between the first electrode and the second electrode applied to the liquid crystal; and wherein between the gate electrode overlapping area and the gate electrode non-overlapping area, an unevenness in an upper surface of the first electrode is less than an unevenness in a lower surface of the first electrode, and an unevenness is an upper surface of the capacitive insulating layer is less than the unevenness of the upper surface of the first electrode.

2. The liquid crystal display device of claim 1, wherein the first electrode and the second electrode are formed using coating ink in which one of metal microparticles are dispersed in a solvent and an organic polymer is dissolved.

3. The liquid crystal display device of claim 1, wherein the pixel area including the upper layer of the thin film transistor has the first electrode in direct contact with the upper layer of the thin film transistor, the capacitive insulating layer, and the second electrode, and does not have the base electrode.

4. The liquid crystal display device of claim 1, wherein the pixel area including an upper layer of the thin film transistor has the first electrode in direct contact with the upper layer of the thin film transistor, the capacitive insulating layer, and the second electrode, and does not have the base electrode; and the total light transmittance of a layered structure of the first electrode, the capacitive insulating layer and the second electrode is 80% or higher in a visible light region having wavelength of 400 nm to 800 nm.

5. The liquid crystal display device of claim 1, wherein the pixel area includes a reflective display part, the base electrode is not provided in the transmissive display part, and the base electrode is provided in the reflective display part.

6. The liquid crystal display device of claim 1, wherein
the pixel area has a reflective display part;
the reflective display part has the base electrode;
the base electrode has concavities and convexities for diffuse reflection;
the concavities and convexities include upwardly convex areas and upwardly concave areas; and
between the upwardly convex area and the upwardly concave area in the reflective display part, an unevenness of an upper surface of the first electrode is less than an unevenness of the lower surface of the first electrode, and an unevenness of an upper surface of the capacitive insulating layer is less than the unevenness of the upper surface of the first electrode.

7. The liquid crystal display device of claim 1, wherein the pixel area has a wiring connection area in which at least one of the base electrode, the common electrode and the pixel is in contact with the drain electrode; and
wherein between the wiring connection area and areas other than the wiring connection area, an unevenness of an upper surface of the first electrode is less than an unevenness of a lower surface of the first electrode, and an unevenness of an upper surface of the capacitive insulating layer is less than the unevenness of the upper surface of the first electrode.

* * * * *